United States Patent [19]
Chinn et al.

[11] Patent Number: 5,386,801
[45] Date of Patent: Feb. 7, 1995

[54] DOG DROPPINGS CATCHER APPARATUS

[76] Inventors: Edward Y. Chinn; Gladys C. Chinn, both of 6111 51st Ave. S., Seattle, Wash. 98118

[21] Appl. No.: 186,630

[22] Filed: Jan. 26, 1994

[51] Int. Cl.$^6$ ............................................. A01K 23/00
[52] U.S. Cl. ............................................................ 119/95
[58] Field of Search ................ 119/95; 604/394, 396, 604/398, 395, 400

[56] References Cited

U.S. PATENT DOCUMENTS

| | | | |
|---|---|---|---|
| 2,801,632 | 8/1957 | Burner et al. | 604/392 |
| 2,863,455 | 12/1958 | Holce | 604/400 |
| 2,910,982 | 11/1959 | Woodward | 604/392 |
| 3,211,132 | 10/1965 | Hersh | 119/95 |
| 3,875,903 | 4/1975 | Sarvary | 119/95 |
| 4,095,562 | 6/1978 | Graham | 119/95 |
| 4,577,591 | 3/1986 | Wesseldine | 119/95 |
| 4,728,326 | 3/1988 | Gilles | 604/392 |
| 4,917,683 | 4/1990 | Thompson | 119/95 |

FOREIGN PATENT DOCUMENTS 9101084  2/1991 ..................................................... 119/95

Primary Examiner—Paul J. Hirsch
Attorney, Agent, or Firm—Robert W. Jenny

[57] ABSTRACT

The basic component of the apparatus is a plastic bag, similar to those dispensed in supermarkets, modified to suit the requirements of the subject invention. The modification is effected by cutting specific features into a bag having two sides and lying flat and having its open end to the right, closed end to the left and having a top edge and a bottom edge. The features in a preferred embodiment are (1) holes through the bag near the corner formed by the open end and top edge, these holes being used for attachment of the bag to the dog and, in some cases, attachment of a lanyard between the bag and a dog's collar, (2) a notch in the top edge near the closed end, forming a hole large enough to fit over a dog's tail, (3) small holes in the lower edge near the closed end, forming hole(s) to allow drainage of urine, (4) a cut-out into the open end, parallel to the bottom edge and extending about ⅔ of the length of the bag with its bottom edge about 1½ inches from the bottom edge of the bag, this cut-out forming a folded strap which extends between the dog's hind legs and (5) holes in the ends of the folded strap. A belt is passed through these holes and the holes at the top edge and fastened securely around the dog's waist. On dogs having an upstanding tail the bag is held in place by the tail through the tail hole and the belt holding the straps and passing through the holes in the portion of the open end over the dog's back. On dogs having a drooping tail or no tail, the bag may also be held in place by a lanyard attached between the top, forward portion of the bag or the belt in that area and the dog's collar.

1 Claim, 1 Drawing Sheet

DOG DROPPINGS CATCHER APPARATUS

BACKGROUND OF THE INVENTION

1. FIELD

The subject invention is in the field of clothing and wearable equipment intended to retain liquids and/or solids excreted by humans and animals. In particular it is in the field of such equipment designed for uses with dogs and, still more particularly, for use in retaining the feces of dogs.

2. PRIOR ART

The U.S. patents listed here are a sampling of the wide range of prior art in the particular field of the subject invention.

U.S. Pat. Nos. 3,786,787, 4,510,887 3,817,217, 4,537,153 4,444,152, 4,969,419

U.S. Pat. No. 4,537,153 in particular, with 41 claims, 15 references cited and 119 figures, discloses a wide variety of prior art. Nevertheless, no device or apparatus for catching animal droppings, dog droppings in particular, is known to us, the inventors of the subject catcher, to have achieved widespread use and commercial success. We believe that in order for such a catcher to achieve such success it must be inexpensive, easy to use, and relatively inconspicuous when in use. The low cost would require that much of the catcher be disposable. Accordingly, the objectives of the subject invention are provision of a dog droppings catcher which has the noted features considered essential to widespread use and commercial success of the catcher.

SUMMARY OF THE INVENTION

The subject invention is a dog droppings catcher apparatus. It comprises a plastic bag and, for use on dogs with an upstanding tail, one belt. For use on dogs with very short and/or hanging tails, a lanyard is used to help retain the catcher in place. In its unused condition the bag is flat, rectangular in planform and openable across one of the short sides of the rectangle, this side being termed the open end. Viewing the bag lying flat and with the open end to the right, the sides of the bag are joined at the top and bottom edges and at the closed end and there is a first hole through the bag (both sides) near the upper right hand corner and a second near the lower right hand corner. At the top edge of the bag (in this view) and near the closed end there is a notch which results in a hole which straddles the top edge of the bag. At the lower edge of the bag, near the closed end, there is a small hole through both sides of the bag. Lastly, there is a long, relatively narrow cut-out extending from the open end, parallel to the bottom of the bag with the lower edge of the cut-out as far away from the hole in the lower right hand corner as the hole itself is from the lower edge of the bag. This cut-out is approximately half the length of the bag and results in a folded tie strap with the second round hole near its end. This notch also allows the sides of the bag to be separated and laid over a dog's back with the dog's tail through the upper hole straddling the top edge of the bag and with the strap between the dog's hind legs. The belt is threaded through the holes near the end of the tiestrap and through the holes at the top of the bag and then fastened around the dog's waist to hold the back portion of the bag in place against the dog's rear. In some instances with dogs having no tail or a non-erect tail the lanyard strap may be attached through the first circular holes in the bag or to the waist belt and attached to the dog's collar. The bag, or catcher, is now in place and will catch droppings while allowing urine to escape through the small holes at the bottom of the bag near the back end of the bag.

The invention is described in more detail below with reference to the attached drawings.

DETAILED DESCRIPTION OF THE INVENTION

Figure 1:
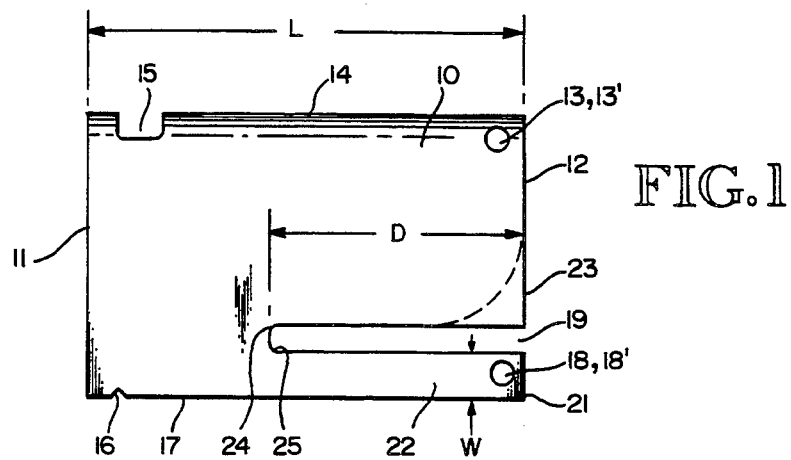
FIG. 1 is a plan view of the subject catcher, as it appears after being manufactured.

The basic component of the subject apparatus is made of a plastic bag similar to those dispensed from rolls in grocery stores in the United States. The bag has two sides and is modified as shown in FIG. 1. In this drawing of bag 10, end 11 is the closed end and end 12 is the open end. The modifications include: (1) holes 13 and 13' cut through both sides of the bag near the open end and top edge 14 of the bag; (2) notch 15 cut into edge 14 near the closed end of the bag; (3) small holes 16 and 16' in lower edge 17 of the bag near the closed end; (4) holes 18 and 18' cut through the sides of the bag near the open end and edge 17; and (5) a cut-out 19 cut through both sides from the open end, parallel to the bottom edge with bottom edge 20 of the cut-out located so that holes 18 and 18' are at the free end 21 of and essentially centered in the width W of folded tie strap 22 formed by the cutting of cut-out 19. Alternate to notch 15 is a diagonal cut 15 indicated by a phantom line, which also forms a hole at the juncture of the top edge and closed end of the bag. Depth D of cut-out 19 is in the range of ½ to ¾ of the length L of the bag with ⅝ preferred. Corner 23 may be contoured generally as indicated by the phantom line. The width W of cut-out 19 is in the range of 0 to 1.5 inches with 1 inch preferred. Corners 24 and 25 are radiused to inhibit tearing of the plastic. The end of the notch may be a portion of a circle with a diameter greater than the width of the notch.

Figure 2:
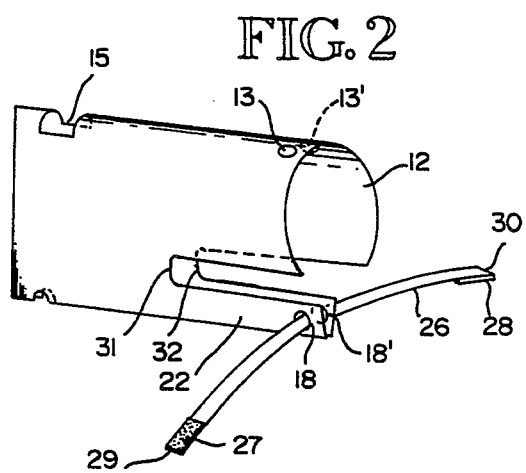
FIG. 2 is a perspective view of the catcher ready to be put in place.

FIG. 2 illustrates the bag in its general conformation when in place on a dog, with numbering the same as in FIG. 1. End 12 is opened and belt 26 is passed through the holes 18 and 18' in strap 22 and through holes 13 and 13'. Patches 27 and 28 of hook and loop fastening material at ends 29 and 30 respectively of the belt serve to fasten the belt around the dog's waist with folded strap 22 between the dog's hind legs.

Figure 3:
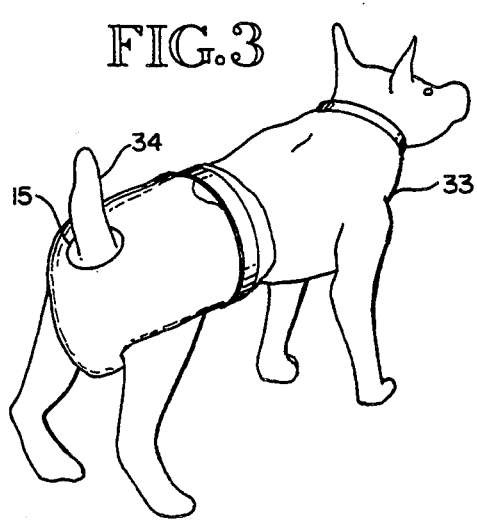
FIG. 3 illustrates the apparatus in place on a dog with an upstanding tail.

FIG. 3 illustrates the apparatus in place on a dog 33 with an upstanding tail 34 extending through notch 15 which, because it straddles the top edge of the bag, forms a hole. In some instances a portion of the bag material over the dog's back and at the open end may be tucked under the belt to help retain the bag. Preferably this portion is held in place by passing the belt through holes 13 and 13'.

Figure 4:
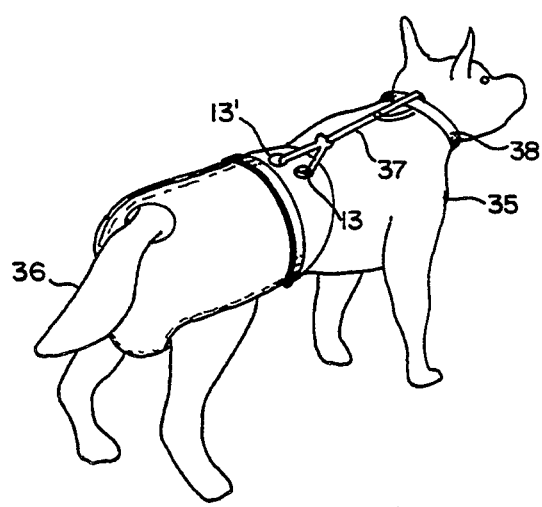
FIG. 4 illustrates the apparatus in place on a dog with a hanging tail.

FIG. 4 illustrates the apparatus in place on a dog 35 with a hanging tail 36. Lanyard 37 may be used with such dogs if the tail tends to displace the bag rather than tend to hold it in place. The lanyard is fastened into holes 13 and 13' or to the belt and attached to the dog's collar 38, using any of a variety of well known fastening techniques.

In use on male dogs the apparatus catches droppings only. On female dogs it catches droppings and urine but the urine drains from holes 16 and 16'. The apparatus components are to be made available in varieties of sizes and colors and transparencies to best suit the wide variety of sizes and colors of dogs and to enhance inconspicuousness.

It is considered to be understandable from this description that the subject invention meets its objectives. It provides a dog droppings catcher apparatus which is inexpensive, easy to use and relatively inconspicuous in use. Ease and economy of use are based on the simplicity of the apparatus, the disposability of the bag and re-use of the waist belt.

It is also considered to be understood that while certain embodiments of the invention are described herein, other embodiments and modifications of those described are possible within the scope of the invention which is limited only by the attached claims.

We claim:

1. A dog droppings catcher apparatus, said dog wearing a collar and having a tail, a back, two hind legs and a waist, said apparatus comprising:
   a bag and
   a belt,
   said bag having a length and two sides, a top edge, a bottom edge, a closed end and an open end, said two sides being joined at said top and bottom edges and said closed end, said bag further having a first hole in said upper edge near said closed end for said tail, second holes near said bottom edge and near said closed end, a cut-out into said open end, said cut-out having upper and lower cut-out edges, a cut-out length and a cut-out width, said lower cut-out edge being parallel to said bottom edge and a distance from said bottom edge in the range of ½ inch to 2 inches, said cut-out width being in the range of 0 to 1½ inches, said cut-out length being in the range of ½ to ¾ of said length of said bag, said cut-out forming a folded tie strap having a free end, said bag further having a tie strap hole in said free end of said folded tie strap, whereby said apparatus is placed on said dog with said tail through said first hole, said tie strap between said hind legs, said belt through said tie strap holes and fastened around said waist, and said top edge along said back.

* * * * *